United States Patent [19]

Cotter

[11] Patent Number: 5,002,236

[45] Date of Patent: Mar. 26, 1991

[54] SEAT BELT RETRACTOR WITH HOLLOW SPOOL

[75] Inventor: Patrick J. Cotter, Plymouth, Mich.

[73] Assignee: TRW Vehicle Safety Systems Inc., Lyndhurst, Ohio

[21] Appl. No.: 366,165

[22] Filed: Jun. 14, 1989

[51] Int. Cl.$^5$ .............................................. B65H 75/48
[52] U.S. Cl. ............................ 242/74; 242/107 R; 242/74.1; 242/107.4; 280/807
[58] Field of Search ................ 254/14; 297/474, 475, 297/482; 280/807; 242/107, 107 R, 107 A, 74, 74.1

[56] References Cited

U.S. PATENT DOCUMENTS

| | | | |
|---|---|---|---|
| 2,521,253 | 11/1945 | Quackenbush | 242/74 |
| 2,911,163 | 11/1959 | Warrick | 242/74 |
| 3,544,028 | 12/1970 | Wangerin | 242/74.1 |
| 3,802,641 | 4/1974 | Saito | 242/107.4 R |
| 3,942,740 | 3/1976 | Torphammer et al. | 242/107.4 B |
| 4,164,337 | 8/1979 | Blom | 242/107.4 |

FOREIGN PATENT DOCUMENTS 1198640 1/1964 Fed. Rep. of Germany ........ 242/74
2817160 10/1979 Fed. Rep. of Germany ..... 242/74.1

Primary Examiner—Daniel P. Stodola
Assistant Examiner—Paul Thomas Bowen
Attorney, Agent, or Firm—Tarolli, Sundheim & Covell

[57] ABSTRACT

A webbing retainer plate retains an end portion of a length of belt webbing within a seat belt retractor spool. The spool includes a spindle and a hollow sleeve spaced outwardly of the spindle and rotatable with the spindle. An opening in the sleeve allows the end of a length of belt webbing to extend into the sleeve. The end of the belt is sewn in a loop and encloses a central portion of the webbing retainer plate. The central portion of the plate clamps the webbing loop against the sleeve and against the spindle, to block the belt end portion from being withdrawn from the sleeve. The webbing retainer plate has two arm portions which extend from the central portion. The plate arm portions engage the inner peripheral surface of the sleeve to maintain the plate in position lodged within the sleeve. The end portion of the belt webbing, including the sewn loop, is located within the outer peripheral surface of the sleeve. This allows the belt webbing to be wound smoothly on the exterior of the sleeve.

10 Claims, 2 Drawing Sheets

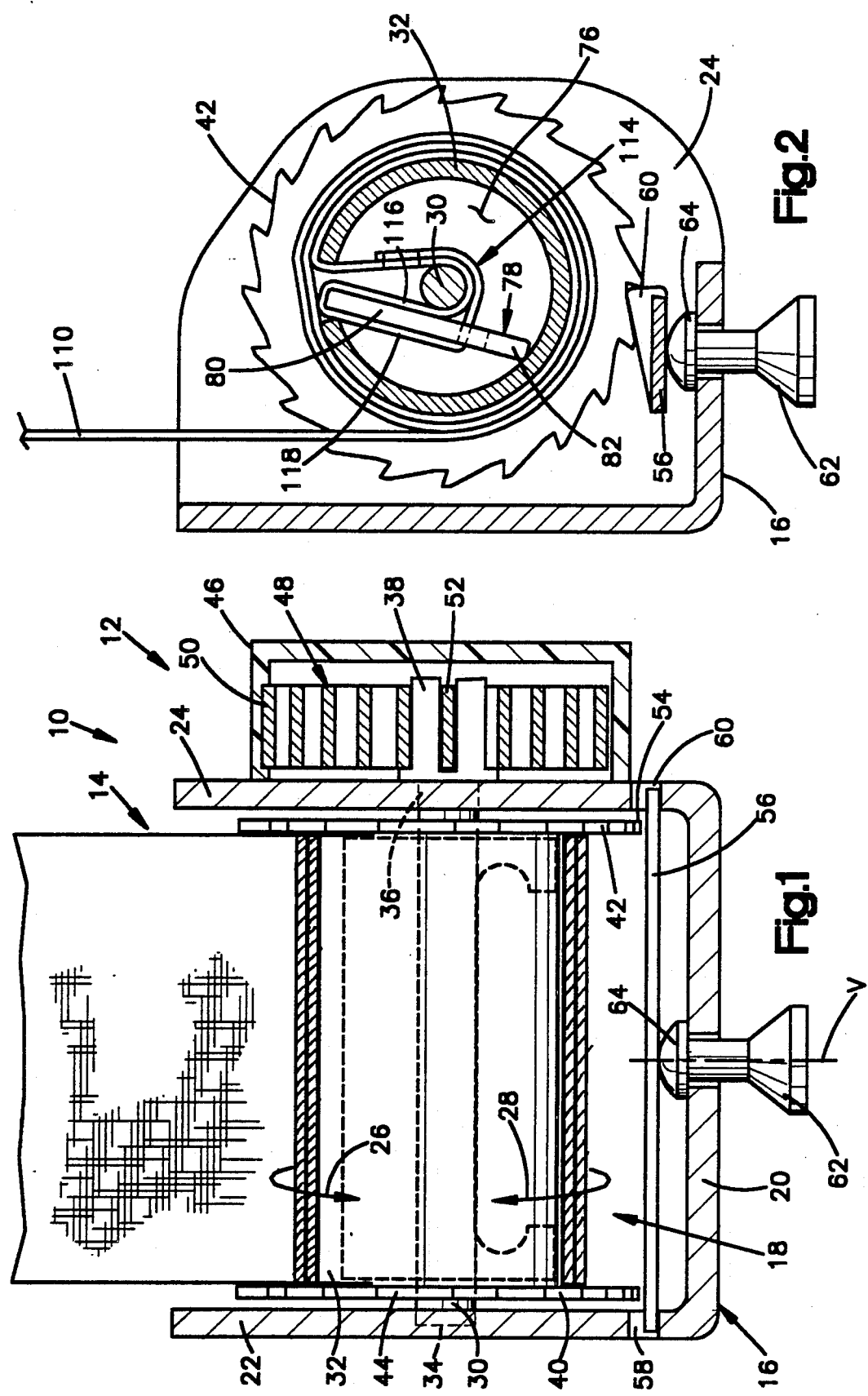

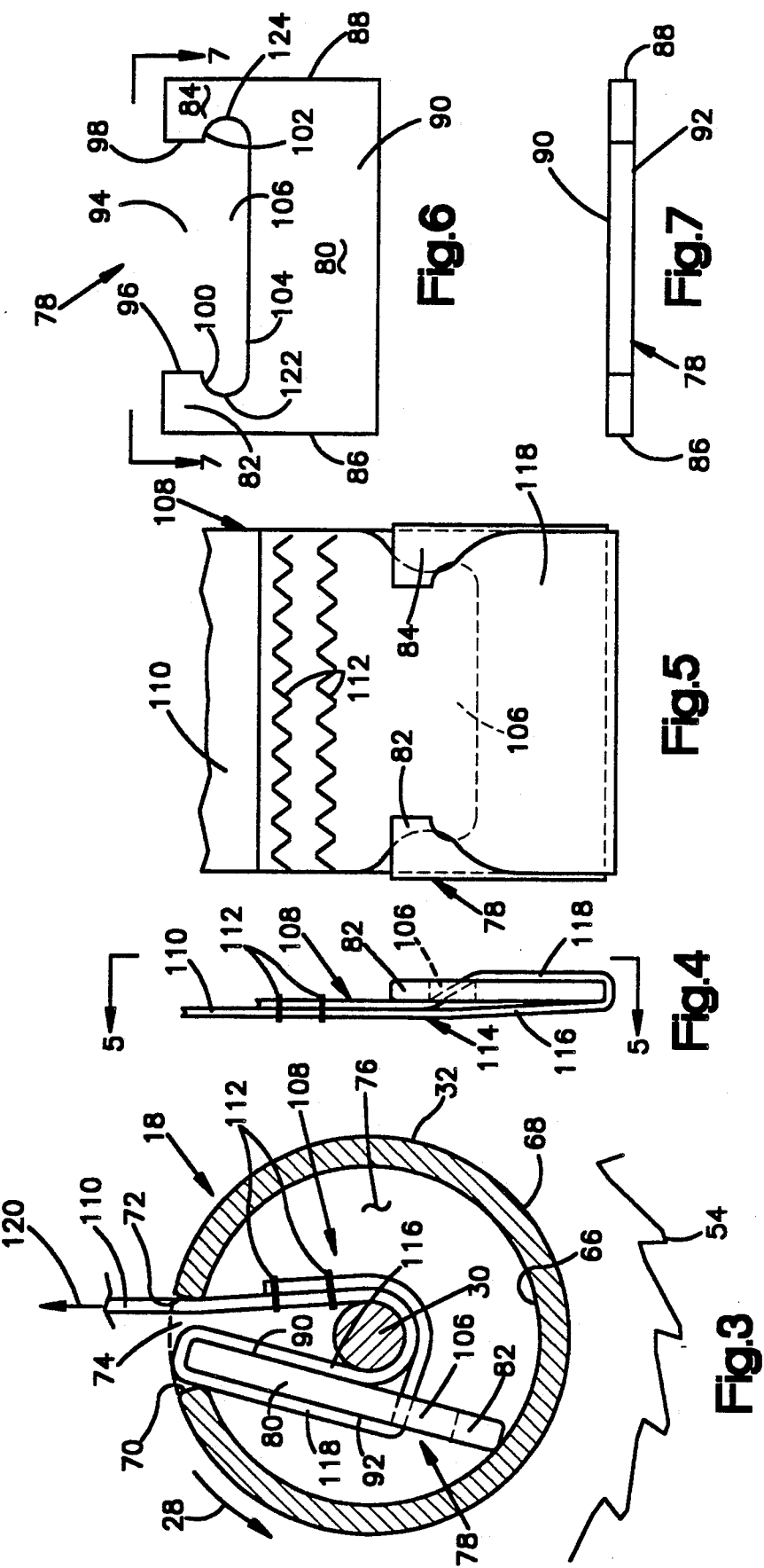

SEAT BELT RETRACTOR WITH HOLLOW SPOOL

BACKGROUND OF THE INVENTION

1. Technical Field

The present invention relates to a seat belt retractor for a vehicle. More particularly, the present invention relates to a seat belt retractor having a hollow spool on which seat belt webbing is wound, with an end of the belt webbing being secured inside the hollow spool.

2. Prior Art

Known seat belt retractors have a hollow spool with an end of the belt webbing secued inside the hollow spool. For example, U.S. Pat. No. 3,802,641 discloses a seat belt webbing retractor spool having a hollow take-up spool and a central rotative spindle. The end portion of the belt webbing is sewn in a loop and held in a gap between the spool and the spindle by a wedge member inserted in the loop. The wedge member is completely encircled by the loop.

SUMMARY OF THE INVENTION

The present invention is a seat belt retractor having a spool on which seat belt webbing is wound. The spool is rotatable in belt withdrawal and belt retraction directions. The spool includes a spindle and a hollow sleeve spaced outwardly of the spindle and rotatable with the spindle. A length of belt webbing extends into the sleeve through an opening in the sleeve. A webbing retainer plate is disposed within the spool. The end of the belt webbing is sewn in a loop and encloses a central portion of the webbing retainer plate. The central portion of the webbing retainer plate clamps the webbing loop against the sleeve and against the spindle, to prevent the belt end portion from being withdrawn from the sleeve. The webbing retainer plate has two arm portions which extend from the central portion. The arm portions engage the inner peripheral surface of the sleeve, maintaining the plate in position lodged within the sleeve.

The end portion of the belt webbing, including the sewn loop, is located within the outer peripheral surface of the sleeve. Thus, the belt webbing can be wound smoothly on the exterior of the sleeve, and the sewn portion of the loop can have a sufficient length to securely attach the belt webbing portion.

BRIEF DESCRIPTION OF THE DRAWINGS

Further features of the present invention will become apparent to those of ordinary skill in the art to which the present invention relates from reading the following description of a preferred embodiment with reference to the accompanying drawings, in which:

FIG. 1 is a longitudinal view partly in section of a seat belt retractor including a hollow spool and webbing retainer plate in accordance with the present invention;

FIG. 2 is a transverse schematic view of the retractor of FIG. 1;

FIG. 3 is an enlarged transverse view of a portion of the retractor of FIG. 1 showing the belt webbing in a fully withdrawn condition;

FIG. 4 is a side view of the belt webbing and the webbing retainer plate;

FIG. 5 is a view of the webbing and retainer plate of FIG. 4 along the line 5—5 of FIG. 4;

FIG. 6 is a front view of the webbing retainer plate; and

FIG. 7 is a view of the webbing retainer plate along the line 7—7 of FIG. 6.

DESCRIPTION OF A PREFERRED EMBODIMENT

FIG. 1 illustrates a vehicle seat belt retractor assembly 10 including a seat belt retractor 12 and belt webbing 14. The retractor 12 includes a frame 16 and a spool 18. The frame 16 has a base portion 20 and a pair of upstanding side portions 22 and 24. The spool 18 is supported for rotation by the frame 16 in a belt withdrawal direction 26 and a belt retraction direction 28. The seat belt webbing 14 is wound on the spool 18.

The spool 18 includes a spindle 30 and a hollow sleeve 32. The spindle 30 is supported for rotation by the frame in a pair of openings 34 and 36 in the frame side portions 22 and 24, respectively. An end portion 38 of the spindle 30 extends through the opening 36 and outwardly of the frame side portion 24. The sleeve 32 is concentric with the spindle 30. The sleeve 32 is spaced radially outwardly from the spindle 30.

The spool 18 also includes a pair of ratchet wheels 40 and 42. The sleeve 32 is staked or otherwise fixed to the ratchet wheels 40 and 42 to secure the sleeve 32 and ratchet wheels 40 and 42 together for rotation. The spindle 30 is keyed at 44 to the ratchet wheel 40 to secure the spindle 30 and ratchet wheel 40 together for rotation. Thus, the ratchet wheels 40 and 42, the sleeve 32, and the spindle 30 are fixed to each other and supported for rotation as a unit relative to the frame 16.

A spring housing 46 extends from the frame side portion 24. The spring housing 46 encloses a spiral spring 48. The spring 48 has a first end 50 connected to the housing 46. A second end 52 of the spring 48 is connected to the end portion 38 of the spindle 30. The spring 48 biases the spool 18 to rotate in the belt retraction direction 28.

A plurality of ratchet teeth 54 extend radially outwardly from each of the ratchet wheels 40 and 42 and are equally spaced about the outer periphery of the ratchet wheels 40 and 42. A locking pawl 56 extends between the side portions 22 and 24 of the frame 16. The locking pawl 56 is supported for pivotal movement in openings 58 and 60 in the frame side portions 22 and 24, respectively. The locking pawl 56 is pivotable from a position disengaged from the ratchet wheels 40 and 42, as shown in FIGS. 1 and 2, to a position engaging the ratchet wheels 40 and 42, to block rotation of the spool 18 in the belt withdrawal direction 26.

A pendulum-type inertia member 62 is supported by the frame base portion 20 for pivotal movement. Upon acceleration or deceleration of the vehicle at a rate above a predetermined rate, the inertia member 62 pivots from an unactuated position, as illustrated in FIGS. 1 and 2, to an actuated position displaced from the vertical axis V. Upon pivotal movement of the inertia member 62, the head portion 64 of the inertia member 62 moves upwardly away from the frame base portion 20 and pushes against the locking pawl 56. The locking pawl 56 pivots into engagement with the ratchet wheels 40 and 42. The spool 18 is thus blocked from rotation in the belt withdrawal direction 26. It should be noted that the inertia locking mechanism shown and described herein is illustrative only, and the retractor 12 may alternatively include one of various other known inertia locking devices.

The sleeve 32 (FIG. 3) is hollow and has an inner peripheral surface 66 and an outer peripheral surface 68. Surfaces 70 and 72 define an axially extending slit or opening 74 in the sleeve 32. The outer peripheral surface 68 of the sleeve 32 defines a chamber 76 within the sleeve 32, which chamber 76 includes the opening 74.

A webbing retainer plate 78 is disposed within the sleeve 32. The webbing retainer plate 78 (FIG. 6) includes a central portion 80 and a pair of spaced arm portions 82 and 84 extending from the central portion 80. The plate 78 has parallel opposite side surfaces 86 and 88 (FIG. 7). The plate 78 also has opposite major side surfaces 90 and 92 extending between the side surfaces 86 and 88. The plate 78 is a flat C-shaped piece of metal.

An opening 94 (FIG. 6) extends between the plate arm portions 82 and 84. The opening 94 is defined by a pair of parallel arm side surfaces 96 and 98, a pair of curved surfaces 100 and 102, and an edge surface 104 along the plate central portion 80. The curved surfaces 100 and 102 define therebetween a slot 106. The slot 106 is a portion of the opening 94.

The seat belt webbing 14 (FIGS. 3-5) includes a belt end portion 108 and a longitudinal portion 110. The belt end portion 108 is folded over and sewn along a length thereof to form a webbing loop 114 which receives the central portion 80 of the webbing retainer plate 78. The webbing loop 114 includes a first loop portion 116 and a second loop portion 118 which are located on opposite sides of the plate central portion 80. The first loop portion 116 is disposed adjacent the first major side surface 90 of the plate central portion 80. The second loop portion 118 is disposed adjacent the second major side surface 92 of the plate central portion 80. The second loop portion 118 extends through the slot 106 (FIGS. 3 and 4) and behind the plate arm portions 82 and 84 (FIG. 5) and is sewn at 112 along a length thereof to the first loop portion 116. The plate 78 is thus retained in the webbing loop 114.

The plate 78 has a length, as measured along the side surfaces 86 and 88, which is great enough so that the plate 78 cannot move further into the chamber 76 than as shown in FIG. 3. The plate 78 is sized so that when located as shown in FIG. 3 the plate 78 and the belt end portion 108 are disposed completely within the outer peripheral surface 68 of the sleeve 32, and thus are located within chamber 76. If there is a pull on the belt portion 110 in the direction shown by the arrow 120, the webbing retainer plate 78 is automatically lodged in the position shown in FIG. 3. In this position, the belt end portion 108 is retained within the chamber 76 while the longitudinal belt portion 110 extends outwardly of the sleeve 32 through the opening 74. The plate 78, and specifically the plate central portion 80, clamps the belt end portion 108 against the spindle 30 and against the surface 70 of the sleeve 32. Thus, forces acting on the belt webbing 14, in the direction of belt withdrawal as shown by the arrow 120, cannot pull the belt end portion 108 from the chamber 76.

In the position shown in FIG. 3, the plate 78 extends between the surface 70, the spindle 30, and the inner peripheral surface 66 of the sleeve 32. The plate central portion 80 is disposed in the chamber 76 between the sleeve 32 and the spindle 30. The plate arm portions 82 and 84, only one of which is seen in FIG. 3, are disposed in the chamber 76 between the spindle 30 and the inner peripheral surface 66 of the sleeve 32. The plate central portion 80, and the plate 78 as a whole, are maintained in position by the plate arm portions 82 and 84 which project from the plate central portion 80 beyond the sides of the webbing loop 114 and engage the inner peripheral surface 66 of the sleeve 32. The first and second webbing loop portions 116 and 118 extend away from the plate 78 to wrap about the spindle 30 in facing engagement with each other. The plate 78 and the belt end portion 108 are disposed completely within the outer peripheral surface 68 of the sleeve 32. Thus, the longitudinal portion 110 of the belt webbing 14 can wrap smoothly around the outer peripheral surface 68 of the sleeve when the spool 18 is rotated in the belt retraction direction.

The webbing retainer plate 78 has an overall width equal to the distance between the side surfaces 86 and 88. The opening 94 has a minimum transverse dimension equal to the distance between the arm side surfaces 96 and 98. The slot 106 has a width, as measured between the points 122 and 124 on the curved surfaces 100 and 102, respectively, which is intermediate the overall width of the plate and the minimum transverse dimension of the opening 94. The width of the plate 78 as measured between the side surfaces 86 and 88, is substantially the same as or preferably slightly greater than the width of the belt webbing 14. The slot 106 is narrower than the overall width of the plate 78. The slot 106 is also narrower than the belt webbing 14. The thickness of the plate 78 is also selected so that the plate 78 will attain and maintain the position shown in FIG. 3.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. An apparatus comprising:
 a length of belt webbing having a longitudinal portion and a belt end portion formed in a webbing loop;
 a frame;
 a spool comprising a spindle and a sleeve;
 said spindle being supported for rotation by said frame;
 said sleeve being concentric with and spaced radially outwardly from said spindle and being rotatable with said spindle, said sleeve having an outer peripheral surface on which said belt webbing is wound and defining a chamber therein, said sleeve having a cylindrical inner peripheral surface of a uniform diameter and surface means defining an opening in said sleeve for said belt webbing to extend therethrough into said chamber; and
 a webbing retainer plate for retaining said belt end portion within said chamber while said longitudinal belt portion extends outwardly of said sleeve through said opening in said sleeve, said webbing retainer plate having a central portion and two arm portions extending from said central portion, said plate being rigid and said arm portions and central portion not being deflectable relative to each other;
 said plate central portion being received in the webbing loop formed in said belt end portion,
 said plate and said belt end portion being disposed within said chamber, and
 said plate arm portions projecting from said plate central portion beyond said webbing loop and engaging said cylindrical inner peripheral surface of said sleeve for positioning said plate within said chamber, said plate central portion clamping said webbing loop of said belt end portion against said spindle and against said sleeve to prevent withdrawal of said belt end portion from said chamber.

2. An apparatus as defined in claim 1 wherein said spindle is cylindrical and said plate central portion clamps said webbing loop against a cylindrical outer surface of said spindle.

3. An apparatus as defined in claim 1 wherein said plate central portion is disposed within said chamber extending from said surface means defining an opening in said sleeve to said spindle, said plate central portion clamping said webbing loop against said surface means, and said plate arm portions being disposed within said chamber extending approximately from adjacent said spindle in a direction away from said surface means to said inner peripheral surface of said sleeve.

4. An apparatus as defined in claim 3 wherein said sleeve inner peripheral surface defines an inner chamber portion, said surface means defining said opening in said sleeve blocking said plate from entering completely into said inner chamber portion.

5. An apparatus comprising:
   a length of belt webbing having a longitudinal portion and a belt end portion formed in a webbing loop;
   a frame;
   a spool comprising a spindle and a sleeve;
   said spindle being supported for rotation by said frame;
   said sleeve being concentric with and spaced radially outwardly from said spindle and being rotatable with said spindle, said sleeve having an outer peripheral surface on which said belt webbing is wound and defining a chamber therein, said sleeve having an inner peripheral surface and surface means defining an opening in said sleeve for said belt webbing to extend therethrough into said chamber; and
   a webbing retainer plate for retaining said belt end portion within said chamber while said longitudinal belt portion extends outwardly of said sleeve through said opening in said sleeve, said webbing retainer plate having a central portion and two arm portions extending from said central portion;
   said plate central portion being received in the webbing loop formed in said belt end portion,
   said plate and said belt end portion being disposed within said chamber;
   said plate arm portions engaging said inner peripheral surface of said sleeve to position said plate within said chamber, said plate central portion clamping said webbing loop of said belt end portion against said spindle and against said sleeve to prevent withdrawal of said belt end portion from said chamber;
   said plate arm portions being spaced transversely apart from each other to define an opening having a minimum transverse dimension which is substantially less than the width of said belt webbing;
   said plate arm portions being cut back transversely adjacent said plate central portion to form a slot having a width which is intermediate said minimum transverse dimension and the width of said belt webbing; and
   said belt webbing loop extending through said slot between said arm portions.

6. An apparatus as defined in claim 5 wherein said belt webbing extending loop through said slot is substantially wider than said slot.

7. An apparatus as defined in claim 5 wherein said plate is one rigid substantially flat piece of metal.

8. An apparatus as defined in claim 5 wherein said spindle is cylindrical and said plate central portion clamps said webbing loop against a cylindrical outer surface of said spindle.

9. An apparatus as defined in claim 5 wherein said plate central portion is disposed within said chamber extending from said surface means to said spindle, said plate central portion clamps said webbing loop against said surface means, and said plate arm portions are disposed within said chamber extending approximately from adjacent said spindle in a direction away from said surface means to said inner peripheral surface of said sleeve.

10. An apparatus as defined in claim 5 wherein said sleeve inner peripheral surface defines an inner chamber portion located within said chamber, and said plate is long enough that said surface means defining said opening in said sleeve blocks said plate from entering completely into said inner chamber portion.

* * * * *